United States Patent [19]

Ericson et al.

[11] Patent Number: 5,427,428
[45] Date of Patent: Jun. 27, 1995

[54] FOLDING COVER FOR THE BED OF A PICKUP TRUCK

[76] Inventors: John C. Ericson; Linda S. Ericson, both of 4828 Hannibal Way, Las Vegas, Nev. 89130

[21] Appl. No.: 130,729

[22] Filed: Oct. 4, 1993

[51] Int. Cl.6 .............................................. B60P 7/02
[52] U.S. Cl. ........................... 296/98; 296/100; 160/231.1
[58] Field of Search ............... 296/100, 98; 160/32, 160/35, 135, 133, 231.1, 231.2

[56] References Cited

U.S. PATENT DOCUMENTS

| 1,215,223 | 2/1917 | Vanderpoel | 160/231.1 |
| 2,390,116 | 12/1945 | Michelman | 160/133 |
| 3,185,205 | 5/1965 | Caillet | 160/133 |
| 4,418,954 | 12/1983 | Buckley | 296/100 |
| 4,547,014 | 10/1985 | Wicker | 296/100 |
| 4,747,441 | 5/1988 | Apolzer et al. | 296/100 X |
| 4,761,916 | 8/1988 | Sanok et al. | 160/231.2 X |
| 4,830,080 | 5/1989 | Densen | 160/135 |
| 4,844,531 | 7/1989 | Kooiker | 296/100 |
| 4,946,217 | 8/1990 | Steffens et al. | 296/100 |
| 5,087,093 | 2/1992 | Repetti | 296/100 |
| 5,205,336 | 4/1993 | Munekata et al. | 160/133 |

FOREIGN PATENT DOCUMENTS

| 661641 | 4/1963 | Canada | 160/133 |
| 2457837 | 6/1975 | Germany | 160/231.2 |

*Primary Examiner*—Robert J. Oberleitner
*Assistant Examiner*—Gary C. Hoge

[57] ABSTRACT

A folding cover for a pickup truck bed is comprised of a plurality of substantially rigid material sheets hinged together using specially adapted hinges made of a flexible material, the flexible hinges extending the width of the sheets making the cover substantially leakproof/weatherproof. In a second embodiment, the cover can be mounted on rollers which themselves can be rollably supported by a horizontal track mounted to one or both of the side rails of the pickup truck bed to make folding and unfolding of the cover easier.

6 Claims, 4 Drawing Sheets

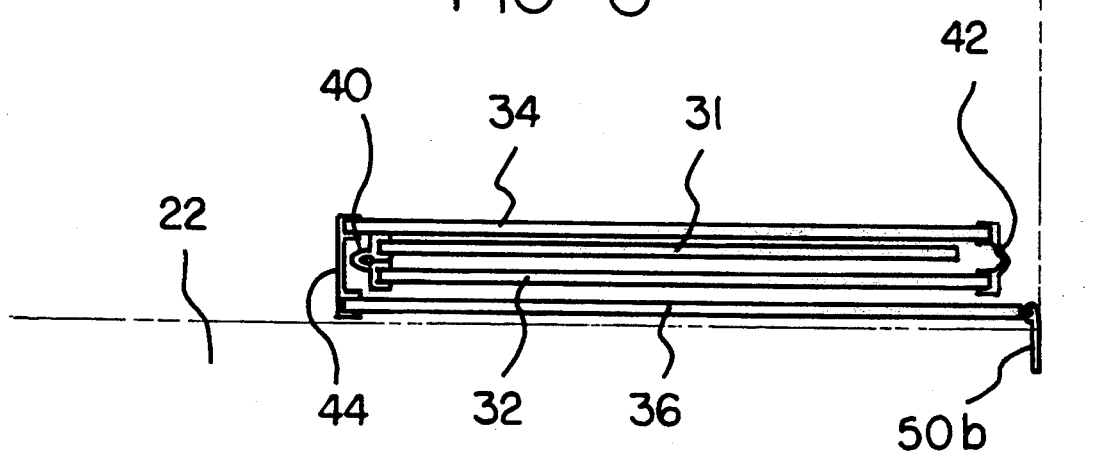
FIG 3
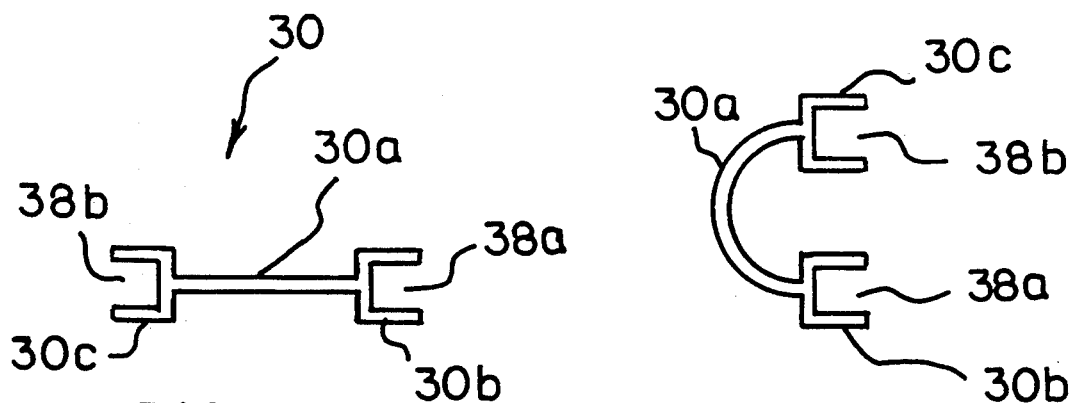
FIG 4
FIG 5

FOLDING COVER FOR THE BED OF A PICKUP TRUCK

BACKGROUND OF THE INVENTION

1. Field of the Invention

The present invention relates generally to pickup trucks, and more particularly, to a cover for the bed of a pickup truck especially adapted to fold up.

2. Description of the Prior Art

Structures for covering pickup truck beds are well known in the prior art. Examples of prior art pickup truck bed covers are "caps" and tonneau covers. It is also known to have a foldable pickup bed cover having hinged together sections which can be folded up (see the following for examples: U.S. Pat. Nos. 4,313,636; 4,418,954; 5,087,093).

Thus, while the foregoing body of prior art indicates it to be well known to use a hinged foldable cover for covering pickup truck beds, the provision of a more simple and cost effective device is not contemplated. Nor does the prior art described above teach or suggest a folding cover for a pickup truck device which may be used by pickup truck owners to cover the beds of their trucks without having to worry about rain leaking through the cover into the bed of the truck and which can be folded and unfolded easier. The foregoing disadvantages are overcome by the unique folding cover for a pickup truck bed of the present invention as will be made apparent from the following description thereof. Other advantages of the present invention over the prior art also will be rendered evident.

SUMMARY OF THE INVENTION

To achieve the foregoing and other advantages, the present invention, briefly described, provides a folding cover for a pickup truck bed comprised of a plurality of substantially rigid material sheets hinged together using specially adapted hinges made of a flexible material, the flexible hinges extending the width of the sheets making the cover substantially leakproof/weatherproof. In a second embodiment, the cover can be mounted on rollers which themselves can be rollably supported by a horizontal track mounted to one or both of the side rails of the pickup truck bed to make folding and unfolding of the cover easier.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new folding cover for a pickup truck bed which has all of the advantages of the prior art and none of the disadvantages.

It is another object of the present invention to provide a new folding cover for a pickup truck bed which may be easily and efficiently manufactured and marketed.

It is a further objective of the present invention to provide a new folding cover for a pickup truck bed which is of durable and reliable construction.

An even further object of the present invention is to provide a new folding cover for a pickup truck bed which is susceptible of a low cost of manufacture with regard to both materials and labor, and which accordingly is then susceptible of low prices of sale to the consuming public, thereby making such folding cover for a pickup truck bed available to the buying public.

Still yet a further object of the present invention is to provide a new folding cover for a pickup truck bed comprised of a plurality substantially rigid material sheets hinged together with specially adapted hinges made of a flexible material, the flexible hinges extending the width of the sheets making the cover substantially leakproof/weatherproof.

It is still a further object of the present invention to provide a new folding cover for a pickup truck bed which can be mounted on rollers which themselves can be rollably supported by a horizontal track mounted to the side rails of the pick up truck bed to make folding and unfolding of the cover easier.

Still a further object of the present invention is to provide a new folding cover for a pickup truck bed including a means for locking the cover in a closed/covering position and/or means for locking the cover in an open/uncovered position.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 3 is a cross-sectional side view of the folding cover for a pickup truck bed of FIGS. 1 and 2 shown in a partially covering position.

FIG. 4 is a perspective side view of a specially adapted hinge for use as part of the present invention.

FIG. 5 is a side view of the hinge of FIG. 4 shown in a folded position in accordance with the present invention.

DESCRIPTION OF THE PREFERRED EMBODIMENT

With reference now to the drawings, a new folding cover for a pickup truck bed embodying the principles and concepts of the present invention will be described.

Figure 1:
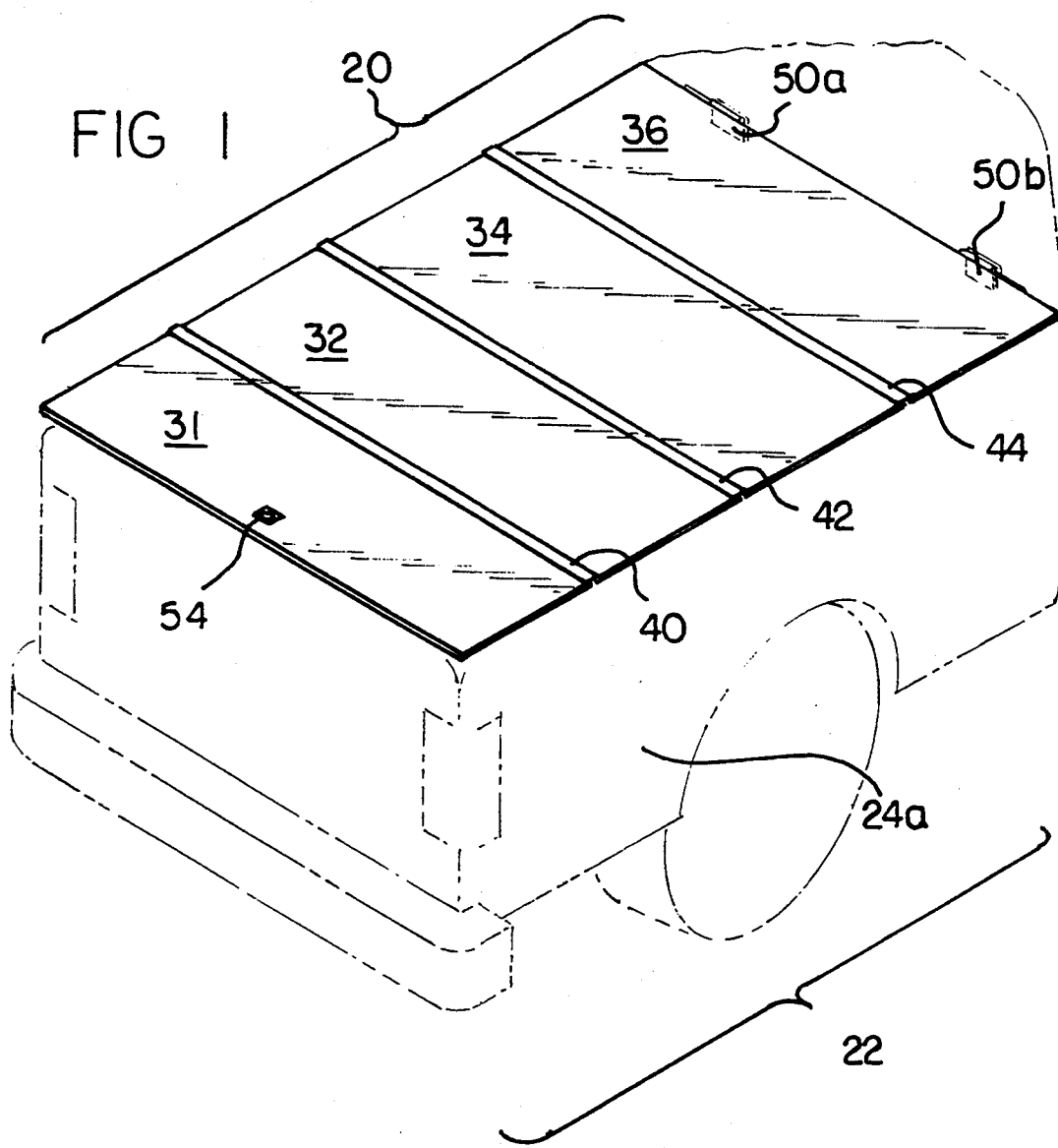
FIG. 1 is a perspective view showing the first preferred embodiment of the folding cover for a pickup truck bed of the present invention mounted in the completely unfolded/covering position on the bed of a pickup truck.
Figure 2:
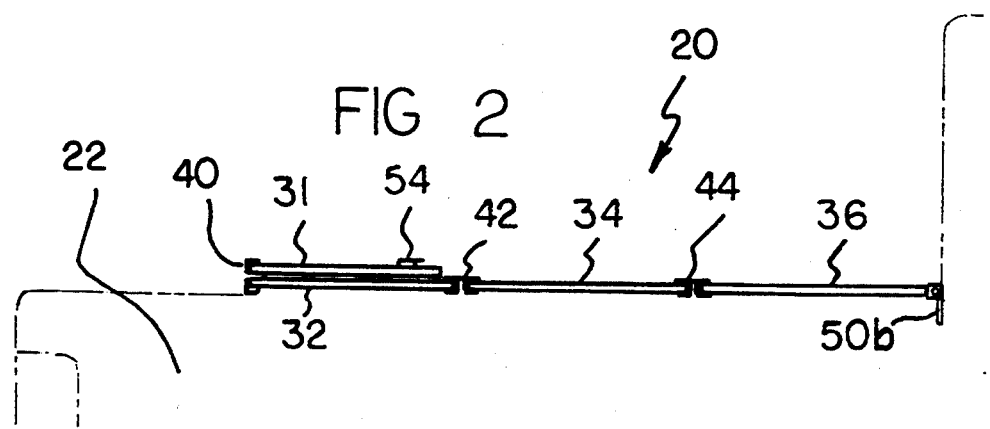
FIG. 2 is a cross-sectional side view of the folding cover for a pickup truck bed of FIG. 1 shown partially folded all in accordance with the present invention.
Figure 6:
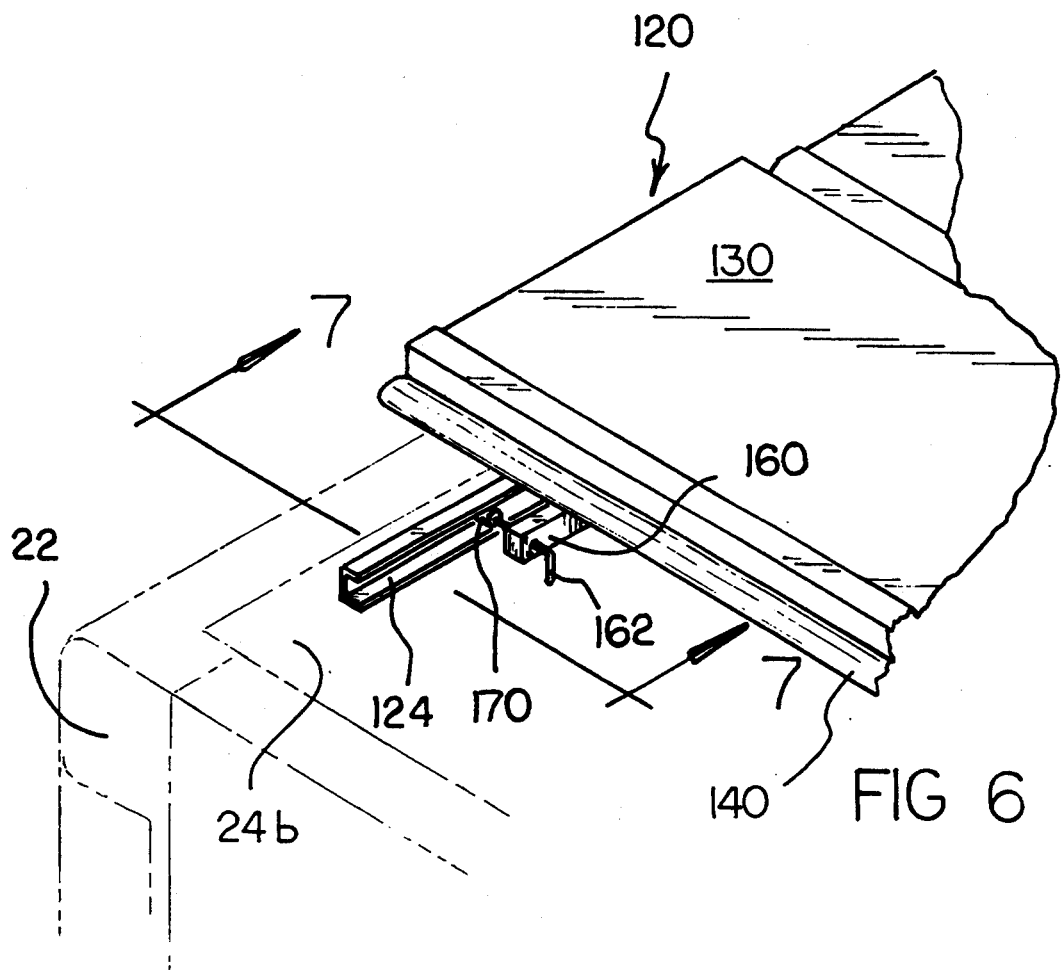
FIG. 6 is a perspective view showing a second preferred embodiment of a folding cover for a pickup truck bed of the present invention mounted on rollers supported by tracks on the sides of the truck above the truck bed.
Figure 7:
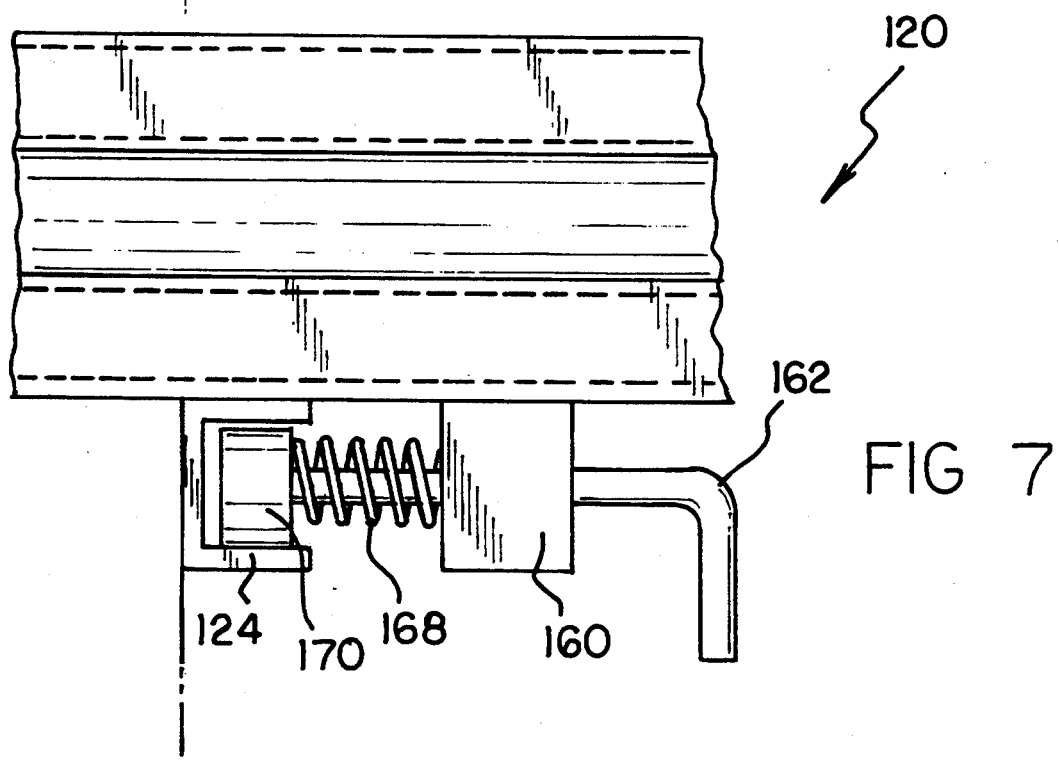
FIG. 7 is a partial cross-sectional side view of the second embodiment folding cover for a pickup truck bed taken along lines 7—7 of FIG. 6 in accordance with the present invention.

Turning initially to FIGS. 1-3, there is shown a first exemplary embodiment of the folding cover for a pickup truck bed of the present invention generally designated by reference numeral 20. In its preferred form, folding cover 20 for a pickup truck bed is shown in FIGS. 1-3 mounted on a pickup truck 22. Folding cover 20 comprises generally four panels 31, 32, 34, 36 (first panel 31, second panel 32, third panel 34 and fourth panel 36) attached by means of three elongated hinges 40, 42, 44 (first elongated hinge 40 holding first panel 31 and second panel 32 together; second elongated hinge 42 holding second panel 42 and third panel 44 together; and third elongated hinge 44 holding third panel 44 and fourth panel 46 together). The elongated hinges 40, 42, 44 are virtually identical and are interchangeable. The first panel 30 preferably will have a locking means 54 attached for locking the cover 20 in a covering position over the truck bed. Each elongated hinge 40, 42, 44 is the same width as the panels 31, 32, 34, 36. The elongated hinges 40, 42, 44 are made out of a flexible material such as, and preferably, flexible plastic.

One of the elongated flexible hinges 40, 42 or 44 is represented by reference numeral 30 as shown in detail in FIGS. 4 and 5. The flexible hinge 30 has a flat web section 30a with a section 30b extending from one side and a section 30c extending from the other leaving spaces 38a and 38b respectively. The spaces 38a and 38b are sized to snugly fit over the edges of each of the panels 31, 32, 34, and 36. Some type of suitable adhesive can be added to tightly secure the panels 31, 32, 34, and 36 to the flexible hinges 40, 42 and 44. The hinge is shown in its unfolded position in FIG. 4 and in its folded position in FIG. 5. Note that the web section 30a is joined to sections 30b and 30c medially of these parts as substantially shown to facilitate folding of the web section and therefore of the hinge in opposite directions (i.e. section 30c folded above section 30b as viewed in FIG. 5 or section 30c folded below section 30c, not shown).

A first mounting hinge 50a and a second mounting hinge 50b are used to semi-permanently mount the cover 20 to the pickup truck 22. The hinges 50a and 50b can, and preferably are, typical metal hinges common in the prior art (unlike the unique elongated hinges 40, 42 and 44).

A locking means such as locking section 54 shown in FIG. 1 can be used to lock the cover 20 in the closed position covering the bed of the pickup truck 22.

When the cover 20 is on the bed of the pickup truck 22, the edges of the panels 31, 32, 34, 36 rest atop the side walls 24 adjacent the bed of the pickup truck 22.

Installation of the pickup truck cover 20 of the present invention by the purchaser is very easy. First the mounting hinges 50a and 50b (minus the sections of the hinges fixed to the edge of panel 36) are mounted onto the back of the truck 22 cab. The panels 31, 32, 34, 36 and flexible elongated hinges 40, 42, 44 will have been put together prior to purchase preferably using a suitable adhesive such as epoxy to hold the panels 31, 32, 34, 36 and hinges 40, 42, 44 together. The cover 20 can then be mounted onto the mounting hinges 50a and 50b. The edges of the cover 20 will rest on the top of the side walls 24a and 24b of the truck bed.

In FIG. 1 the cover 20 is shown in the completely unfolded, bed covering position. Each of the three flexible hinges 40, 42 and 44 are in their unfolded position (like FIG. 4).

In the side view of FIG. 2 the cover 20 is shown with the first panel 30 folded over the second panel 32 to leave one-quarter of the truck bed exposed and three-quarters covered. The first flexible hinge 40 is in its folded position (like FIG. 5) while the second and third hinges 42 and 44 are in their unfolded position (like FIG. 4).

In FIG. 3 the first panel 31, second panel 32, and third panel 34 are all shown folded over leaving three-quarters of the truck bed uncovered and one-quarter covered. All three of the flexible elongated hinges 40, 42, 44 are in their folded positions (like FIG. 5).

In accordance with an important feature of the invention, the transverse or axial dimension of each of the different panels 31, 32, 34, and 36 is less than the next succeeding panel taken in a direction from the tail of the truck to the cab of the truck (i.e. from left to right as viewed in FIGS. 1 and 2). This graduated or progressive difference in size or transverse dimension facilitates the novel sequential roll-up folding capability of the hinged panels as shown to good advantage in FIG. 3.

In accordance with another important feature of the invention, the folded up cover 20 of FIG. 3 could also be folded up against the back of the pickup truck cab to leave the entire bed uncovered. A locking means (not shown) could be added to lock the folded-up cover 20 in such a position.

The pickup truck cover 20 can be moved between the covered, partially covered, and uncovered positions quickly and easily by virtually anybody. Also, while the cover 20 is shown in its preferred embodiment of having four panels, any number (at least two) of panels could effectively be used depending on the size of the pickup truck bed and the size of panels used so long as the progressive difference in axial or transverse width dimension of succeeding panels described above is adhered to.

A second alternatively preferred embodiment pickup truck bed cover 120 is shown in FIGS. 6-9. The second embodiment has all the features of the first embodiment with the addition of a roller 170 able to roll in a corresponding track 24 mounted on one of the truck bed's side walls 24a (or 24b). Alternatively a track 124 could be mounted on each of the truck's two side walls 24a, 24b and two rollers could be used. The four panels 130, 132, 134, 136 of the second embodiment are almost identical to the panels of the first embodiment except that a support bar 160 is fixed to the bottom of one of the panels, preferably the second panel 132 as can be more clearly seen in FIGS. 8 and 9. The support bar 160 has a hole through which fits an L-shaped axle pin 162 at the end of which the roller 170 is rotatably fixed. A spring 168 normally urges the roller 170 into the track 124, however pulling on the L-shaped axle pin 162 (on the bent part of L-shaped axle pin 162) will move the roller 170, against the force of the spring 168, out of the track 124.

The three flexible elongated hinges 140, 142, 146 can be identical to those used in the first embodiment.

Figure 8:
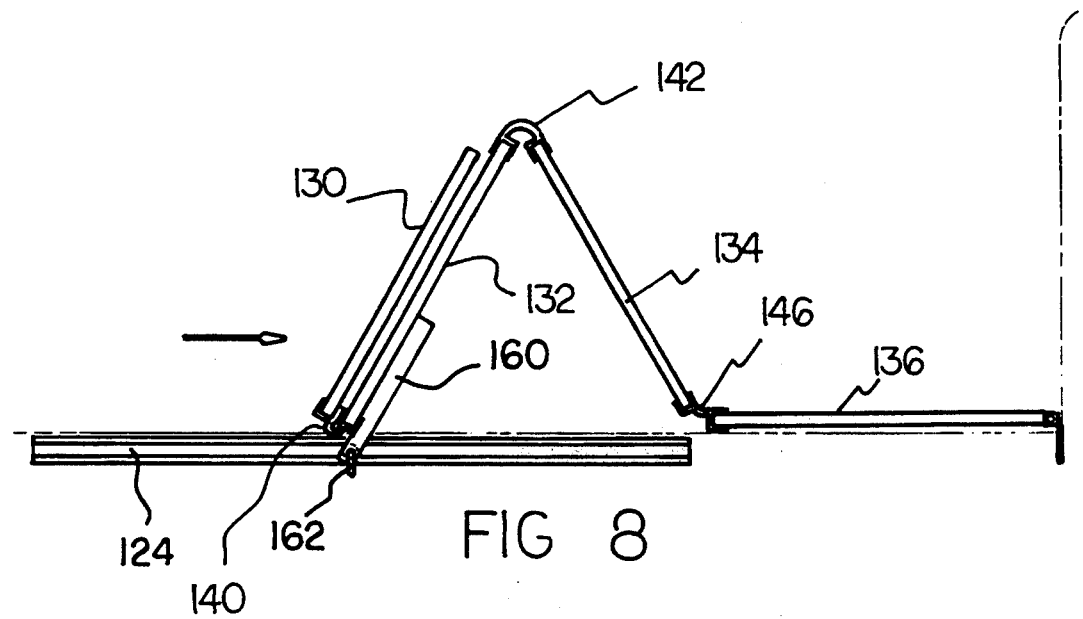
FIG. 8 is a side view of the folding cover for a pickup truck bed of FIGS. 6 and 7 particularly showing the sliding of the cover in accordance with the present invention.
Figure 9:
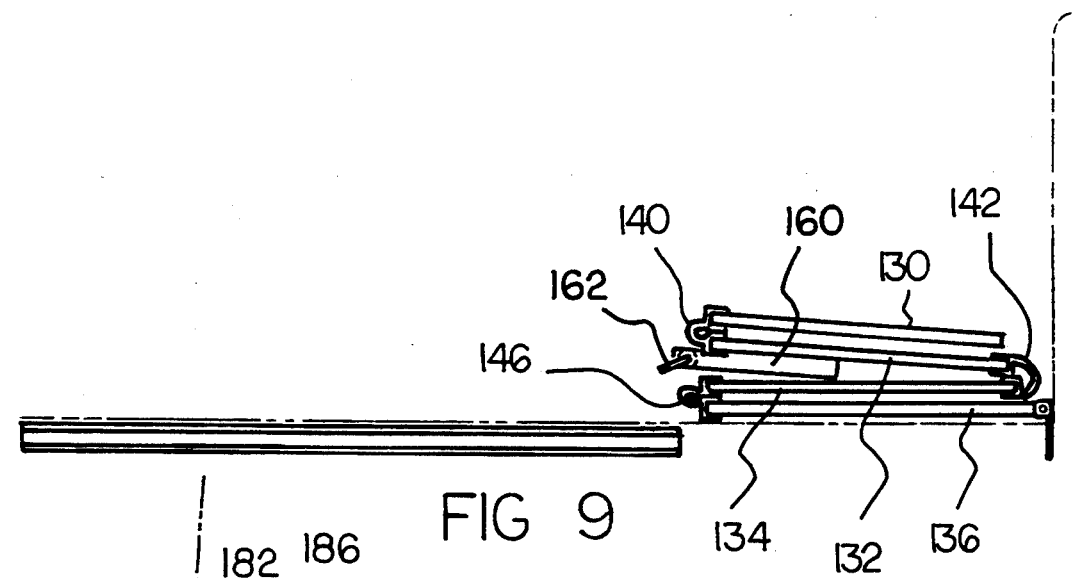
FIG. 9 is a side view of a the folding cover for a pickup truck of FIGS. 6 and 7 shown in a one-quarter truck bed covering position in accordance with the present invention.

The second embodiment pickup truck cover 120 is used by positioning the roller 170 in the track 124 and sliding the cover 120 to a folded (as shown in FIGS. 8 and 9) or unfolded position. The roller 170 can be positioned in the track 124 or removed from the track 124 as is desired using the spring loaded L-shaped axle pin 162.

Figure 10:
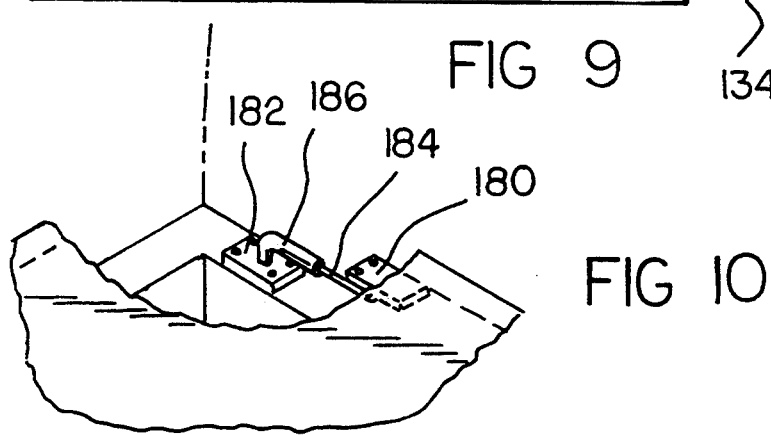
FIG. 10 is a partial view in perspective showing an alternatively preferred form of hinge construction employed with the present invention.

FIG. 10 shows an alternatively preferred hinge arrangement for attaching the pickup truck bed cover 120 to the truck in lieu of hinge units 50a and 50b. As depicted, this hinge arrangement comprises a pair of cooperating assemblies, a male assembly 180, and a female assembly 182. Each assembly 180, 182 includes a plurality of apertures in a flat base portion through which conventional fastener elements may be used to attach the base portion to the underside of panel 36 and the truck bed rail respectively. Extending downwardly from the base portion of male hinge assembly 180 is an L-shaped pin member 184 whereas extending upwardly from the base portion of female hinge assembly 182 is an L-shaped socket member 186. The assemblies are so mounted relative to each other that the pin member may be inserted into the socket member in a manner believed readily apparent to define a hinge capable of movement of its constituent parts about a common axis passing axially through the pin member and the socket member which axis extends parallel to the short or transverse dimension of the bed of the pickup truck. An important advantage of the novel hinge construction just described in connection with FIG. 10 is that the truck bed cover 120 may be easily installed and/or removed merely by slightly flexing panel 36 and either removing or inserting the pin member 184 into its corresponding socket member 186, as the case may be.

Use of the foldable pickup truck bed cover of the present invention provides the appearance of a tonneau cover with the security of a locking hard material truck bed cover. The cover can be constructed to fold into two, three, four or more sections depending on the truck bed length and the needs of the user. It is preferred that when the cover is completely folded up and leaning against the back of the truck cab, the height of the folded up cover is the same or lower than the height of the cab so there will be little or no wind resistance against the folded up cover when the truck is moving.

The panels of the cover are preferably constructed of light weight molded plastic, which can be ribbed or waffled in texture to increase the material's strength and rigidity. Alternatively, the panels could be made of any other suitable material such as, but not limited to, plywood, aluminum or fiberglass.

The flexible elongated hinges are preferably constructed of plastic as mentioned above, although any other suitable material could be used such as, but not limited to, flexible rubber.

The cover is preferably weatherproof such that any goods kept in the truck bed under the cover when it is unfolded will be kept dry. To this end a plastic or rubber piece or skirt can be positioned over the junction of the back of the truck cab and the fourth panel to keep water from seeping in.

It is apparent from the above that the present invention accomplishes all of the objectives set forth by providing a new folding cover for a pickup truck bed comprising:

a plurality of sheets constructed of substantially rigid material axially aligned with respect to each other in a flat juxtaposed manner with each successive sheet having an axial dimension less than that of the next succeeding sheet; at least one specially adapted hinge constructed of a flexible material, the length of the at least one hinge being approximately the same as the long dimension of the sheets; a means for attaching the cover to the pickup truck; wherein the number of the at least one specially adapted hinge is one less than the number of the sheets and wherein one of the at least one specially adapted hinge is fixed between two of the plurality of sheets; whereby the sheets can be folded up over each with the at least one hinge alternately bendable between an unfolded and a folded position. The number of sheets can be four sheets and the number of specially adapted hinge can be three specially adapted hinges. The sheets can be constructed of a light weight molded plastic. The three specially adapted hinges can be constructed of a plastic material. The invention can further comprise: a roller means mounted to one of the plurality of sheets; and a corresponding track which can be fixed to the truck, the roller means rollably engageable with the track means; whereby the plurality of sheets can be at least partially rolled between folded and unfolded positions.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein.

Hence, the proper scope of the present invention should be determined only by the broadest interpretation of the appended claims so as encompass all such modifications and equivalents.

What is claimed as being new and desired to be protected by LETTERS PATENT of the United States is as follows:

1. A folding cover for a pickup truck bed comprising:
    a plurality of sheets constructed of substantially rigid material, each of said sheets having approximately the same width;
    at least one hinge constructed of a flexible material, the length of said at least one hinge being approximately the same as the width of said sheets;
    a means for attaching the cover to the pickup truck;
    wherein the number of said at least one hinge is one less than the number of said sheets and wherein one of said at least one hinge is fixed between two of said plurality of sheets;
    wherein said sheets are dimensioned such that they can be folded up over each other with said at least one hinge alternately bendable between an unfolded and a folded position,
    wherein said plurality of sheets are dimensioned such that the dimension of each sheet in the direction of folding is less than the next succeeding adjacent sheet, and
    wherein said at least one hinge comprises a first channel member for receiving the transverse edge of one of said plurality of sheets, a second channel member for receiving the transverse edge of another of said plurality of sheets, and a flexible web member connected between said first and second channel members, said web member having a longitudinal extent sufficient to permit said one sheet and said another sheet to be folded with respect to each other with one or more other of said plurality of sheets therebetween.

2. The invention of claim 1 wherein said plurality of sheets are constructed of a light weight molded plastic.

3. The invention of claim 2 wherein said at least one hinge is constructed of a plastic material.

4. The invention of claim 1 further comprising:
    a roller means mounted to one of said plurality of sheets;
    and a corresponding track which can be fixed to the truck, said roller means rollably engageable with said track means;
    whereby said plurality of sheets can be at least partially rolled between folded and unfolded positions, and wherein said roller means further comprises:
    an axle having first and second opposed ends, a roller member attached to said first end and adapted to engage said track, a mounting bracket affixed to said one sheet for supporting said axle such that said axle is slidable relative to said bracket between a first position wherein said roller member is engaged in said track and a second position wherein said roller is withdrawn from engagement with said track, and resilient means on said axle between said roller member and said mounting bracket for normally biasing said roller member and said axle in said first position and for permitting slidable movement of said axle relative to said to move said roller to said second position.

5. The invention of claim 1 wherein said plurality of sheets is four sheets and said at least one specially adapted hinge is three specially adapted hinges.

6. The invention of claim 1 wherein said means for attaching the cover to said truck comprises at least one disengageable hinge assembly said disengageable hinge assembly comprising:
    a first hinge member, said first hinge member having an axially extending socket, said socket being attached to a first base member, said first base member including means for attachment to said truck,
    a second hinge member, said second hinge member having an axially extending pin adapted to be axially received with said axially extending socket, said second hinge member including means for attachment to one of said plurality of sheets, and
    wherein said axially extending socket and said axially extending pin are aligned along an axis parallel to said one of said plurality of said sheets.

* * * * *